United States Patent [19]

Hartz

[11] Patent Number: 5,265,332
[45] Date of Patent: Nov. 30, 1993

[54] CASTER SHELL SURFACE COATING METHOD

[75] Inventor: Warren C. Hartz, McKenzie, Tenn.

[73] Assignee: Norandal USA, Inc., Huntington, Tenn.

[21] Appl. No.: 986,832

[22] Filed: Dec. 8, 1992

[51] Int. Cl.$^5$ .................... B21B 31/08; B21B 27/03
[52] U.S. Cl. ................ 29/895.212; 29/895.32; 492/54
[58] Field of Search ............ 29/895.21, 895.212, 29/895.32; 492/54

[56] References Cited

U.S. PATENT DOCUMENTS

| | | | |
|---|---|---|---|
| 2,793,571 | 5/1957 | Way et al. ............ | 29/895.21 X |
| 2,984,473 | 5/1961 | Ornitz et al. ............ | 492/54 X |
| 3,014,266 | 12/1961 | Samuels et al. ............ | 29/895.212 |
| 3,165,179 | 1/1965 | Shapland ............ | 492/54 X |
| 3,718,956 | 3/1973 | Sekimoto et al. ............ | 29/895.212 X |
| 5,111,567 | 5/1992 | Leino et al. ............ | 29/895.32 X |

FOREIGN PATENT DOCUMENTS

| | | | |
|---|---|---|---|
| 0319236 | 3/1920 | Fed. Rep. of Germany ... | 29/895.32 |
| 1129205 | 6/1986 | Japan ............ | 492/54 |
| 1258806 | 10/1989 | Japan ............ | 492/54 |
| 0820099 | 9/1959 | United Kingdom ............ | 29/895.21 |

Primary Examiner—Timothy V. Eley
Attorney, Agent, or Firm—Keck, Mahin & Cate

[57] ABSTRACT

A method of preventing galling between the shell and the core of a roll casting machine during the operation of a roll casting machine comprises coating by electroplating the inside diameter of the roll shell with a layer of chromium to a coating thickness in the range of 0.001 in. to 0.01 in. before the shell is shrink-fitted on the core.

2 Claims, 1 Drawing Sheet

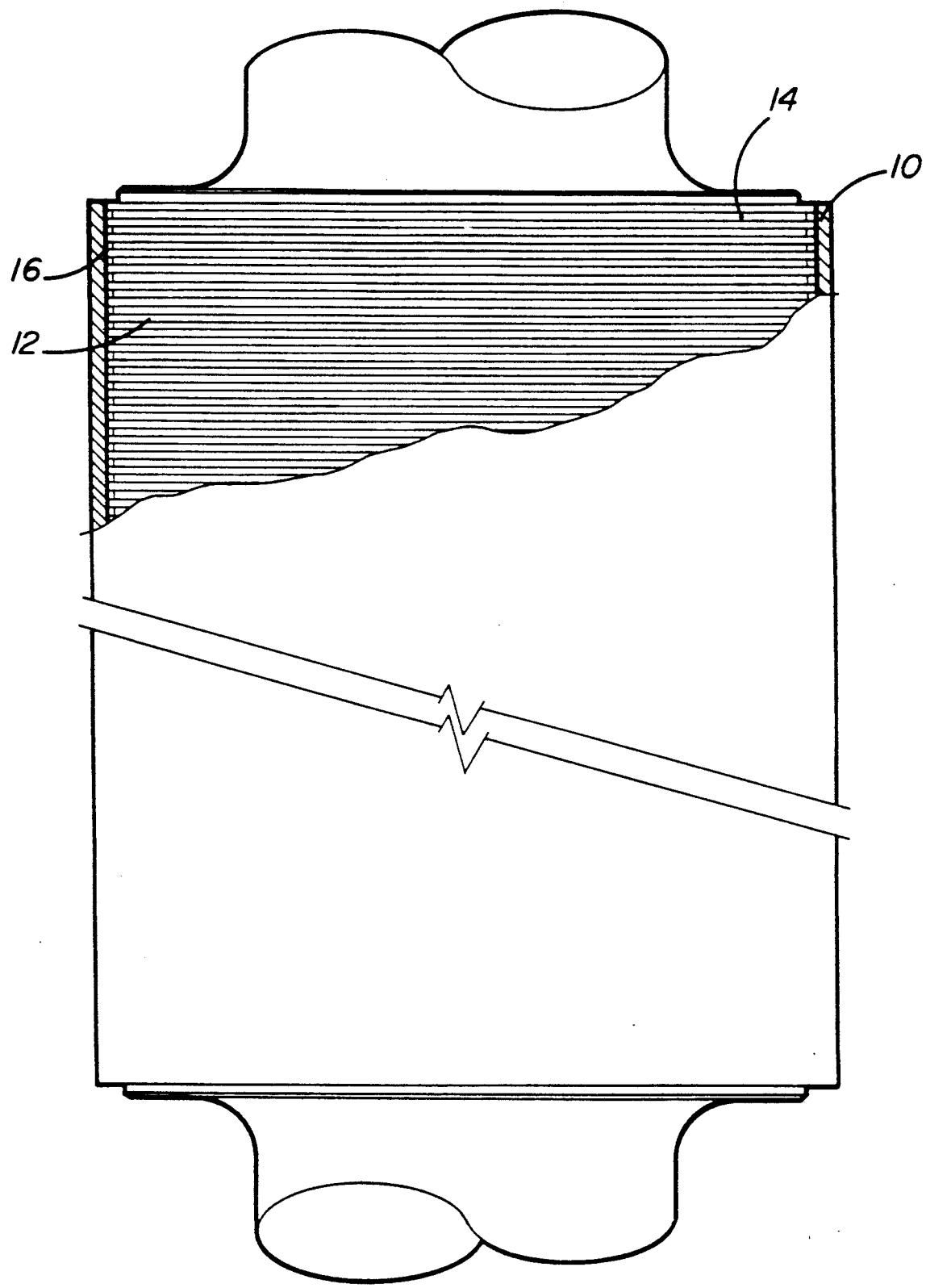

CASTER SHELL SURFACE COATING METHOD

This invention relates to a method of preventing galling between the shell and the core of a roll casting machine during the operation.

BACKGROUND OF THE INVENTION

In the previous method of preparing a shell for fitting to a roll core, the inside diameter surface of the shell is ground to a finish of 30 to 40 micro-inches, honed and shrink fitted onto the core. During operation of the roll casting machine, a small amount of slippage takes place between the shell and core, which results in galling with metal pick-up on one or both members. The consequences of slippage and galling are severe damage to core surfaces, which must be rebuilt during shell changes, and reduction of shell service life due to loss of shape and increased heat checking.

SUMMARY OF THE INVENTION

In the present invention, the inside diameter of the roll shell is coated by electroplating with a layer of chromium to a coating thickness in the range of 0.001 in. to 0.01 in. The shell is then shrink-fitted to the core in the normal manner.

BRIEF DESCRIPTION OF THE DRAWING

The invention will now be disclosed with reference to a drawing illustrating a schematic view of a portion of a roll shell and core assembly.

DETAILED DESCRIPTION OF THE INVENTION

Referring to the drawing, there is shown a schematic view of a shell and core assembly comprising a shell 10 assembled on a core 12 which is provided with a plurality of cooling channels 14 for cooling the roll in known manner. In accordance with the present invention the inside diameter of the shell is coated by electroplating with a chromium layer 16 to a coating thickness in the range of 0.001 in. to 0.01 in. using conventional hard chrome plating techniques. The term "hard chrome" refers to an electrochemical process contrary to "decorative chrome" which is merely a chemical dip process. In the "hard chrome" process the shell is cleaned and filled with chromic acid and acts as the cathode while a chrome anode is placed in the acid solution at the center point of the shell. At the start of the process the current is reversed to open up the pores of the shell, then reversed again to start the plating process. The shell is then shrink-fitted to the core.

The following benefits are derived from the present invention:

a) greatly reduced abrasion, galling and metal pick up at the shell/core interface due to the chromium coating;

b) elimination of corrosion and plugging of the core cooling channels by oxide scale;

c) approximately 75% increase in the service life of the shell, and d) major reduction in weld repair of the roll cores.

I claim:

1. In the manufacture of a roll for a roll casting machine having a core and a shell surrounding the core, a method of preventing galling between an outside diameter of the core and an inside diameter of the shell due to slipping between the shell and the core during operation, comprising:

a) coating by electroplating the inside diameter of the shell with a layer of chromium having a coating thickness between 0.001 in and 0.01 in; and b) shrink-fitting the shell onto the core.

2. A method as defined in claim 1, wherein the chromium coating layer is applied by an electrochemical process.

* * * * *